United States Patent [19]

Mildrum et al.

[11] Patent Number: 4,708,845
[45] Date of Patent: Nov. 24, 1987

[54] BWR FUEL ASSEMBLY WITH IMPROVED SPACER AND FUEL BUNDLE DESIGN FOR ENHANCED THERMAL-HYDRAULIC PERFORMANCE

[75] Inventors: Claude M. Mildrum, Monroeville Borough; Rusi P. Taleyarkhan, Pittsburgh, both of Pa.

[73] Assignee: Westinghouse Electric Corp., Pittsburgh, Pa.

[21] Appl. No.: 852,853

[22] Filed: Apr. 16, 1986

Related U.S. Application Data

[63] Continuation-in-part of Ser. No. 789,256, Oct. 18, 1985, abandoned.

[51] Int. Cl.$^4$ ............................................. G21C 3/32
[52] U.S. Cl. ................................... 376/435; 376/349; 376/414; 376/419; 376/434; 376/438; 376/442; 376/443
[58] Field of Search ............... 376/349, 414, 419, 434, 376/435, 438, 441, 442, 443

[56] References Cited

U.S. PATENT DOCUMENTS 3,180,801  4/1965  Rickert et al. .
3,317,399  5/1967  Winders .
3,350,275  10/1967  Venier et al. .

(List continued on next page.)

FOREIGN PATENT DOCUMENTS 0051441   5/1982  European Pat. Off. ............ 376/435
0065697  12/1982  European Pat. Off. ............ 376/435

(List continued on next page.)

*Primary Examiner*—Deborah L. Kyle
*Assistant Examiner*—Richard W. Wendtland

[57] ABSTRACT

A fuel assembly has a bundle of elongated fuel rods disposed in a side-by-side relationship so as to form an array of spaced fuel rods, an outer tubular flow channel surrounding the fuel rods so as to direct flow of coolant/moderator fluid along the fuel rods, a hollow water cross extending centrally through and interconnected with the outer flow channel so as to divide the channel into separate compartments and the bundle of fuel rods into a plurality of mini-bundles thereof being disposed in the respective compartments, and a plurality of spacers axially displaced along the fuel rods in each of the mini-bundles thereof. Each of the fuel rods includes an outer cladding tube with an inner clad surface and a plurality of fuel pellets contained within the tube. Each spacer is composed of a plurality of interleaved inner straps and an outer strap encompassing the inner straps. The interleaved inner straps and the outer strap have respective protrusions formed thereon and together define spacer cells into which the respective protrusions extend to maintain the fuel rods received through the spacer cells in laterally spaced relationships in respective corner, side and interior cells defined by the interleaved inner straps and the outer straps. The BWR fuel assembly includes several improvements which enhance its thermal-hydraulic performance. First, each of the fuel rods received through the corner cells of each spacer has a diametric size smaller than that of the fuel rods received through the side and interior cells of each spacer. Also, each of the protrusions in the corner cells extend a greater distance into the corner cells than the distance through which the protrusions in the side and interior cells extend into those cells, whereby increased coolant flow space is provided through the corner cells as compared to the side and interior cells so as to increase heat transfer from the corner fuel rods to the coolant. Second, perforations are formed in the outer strap at the locations of the corner and side cells of the spacer for reducing the amount of strap area adjacent the fuel rods received in the corner and side cells and thereby increasing coolant flow to the corner and side fuel rods. Third, a generally uniform poison coating, such as boron, is applied within at least a majority of the fuel rods, the poison coating being applied to either the fuel pellets or the inner clad surface of the cladding tube of each fuel rod in the majority. Additionally, a predetermined pattern of fuel enrichment is provided with respect to the fuel rods of each mini-bundle thereof which together with the uniform poison coatings within the fuel rods ensures that the peaking powers of fuel rods in the corner and side cells of the spacers are less than the peaking power of a leading one of the fuel rods in the interior cells of the spacers.

7 Claims, 8 Drawing Figures

U.S. PATENT DOCUMENTS

| | | |
|---|---|---|
| 3,746,617 | 7/1963 | Iwao et al. . |
| 3,844,886 | 10/1974 | Crowther .............................. 376/435 |
| 3,994,779 | 11/1976 | Brayman et al. . |
| 4,021,300 | 5/1977 | Marshall et al. . |
| 4,059,484 | 11/1977 | Bupp et al. . |
| 4,110,160 | 11/1978 | Hayashi et al. . |
| 4,229,258 | 10/1980 | Takeda et al. . |
| 4,348,355 | 9/1982 | Nylund ............................ 376/434 |
| 4,355,002 | 10/1982 | Hosokawa et al. ................ 376/435 |
| 4,378,329 | 3/1983 | Uchikawa et al. . |
| 4,544,522 | 10/1985 | Curulla et al. ...................... 376/441 |
| 4,560,532 | 12/1985 | Barry et al. ......................... 376/434 |
| 4,587,087 | 5/1986 | Radford et al. ..................... 376/414 |

FOREIGN PATENT DOCUMENTS

| | | | |
|---|---|---|---|
| 0009792 | 1/1977 | Japan .................... 376/435 |
| 0057388 | 5/1978 | Japan .................... 376/349 |
| 0153987 | 4/1979 | Japan .................... 376/435 |
| 0221695 | 12/1984 | Japan .................... 376/349 |
| 0017073 | 4/1985 | Japan .................... 376/435 |

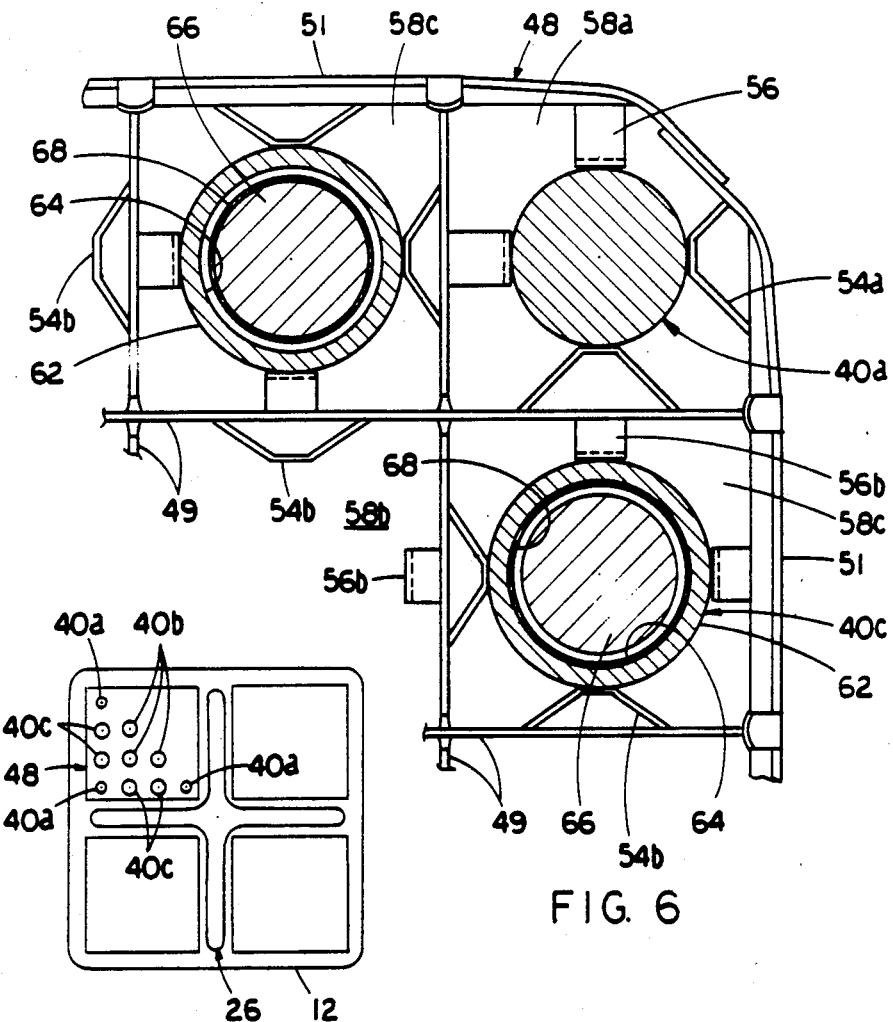
FIG. 6
FIG. 8
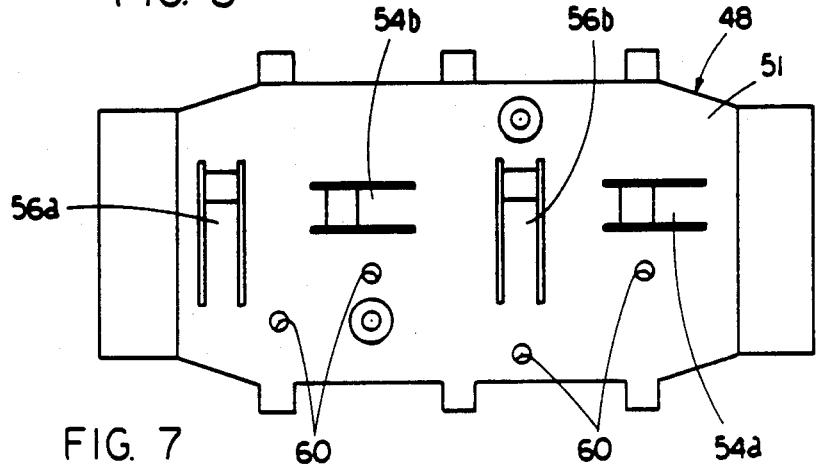
FIG. 7

BWR FUEL ASSEMBLY WITH IMPROVED SPACER AND FUEL BUNDLE DESIGN FOR ENHANCED THERMAL-HYDRAULIC PERFORMANCE

CROSS REFERENCE TO RELATED APPLICATIONS

This application is a continuation in-part of copending U.S. patent application Ser. No. 789,256 and filed Oct. 18, 1985, now abandoned.

Reference is hereby made to the following copending applications dealing with related subject matter and assigned to the assignee of the present invention:

1. "Nuclear Fuel Assembly" by Robert F. Barry et al, assigned U.S. Ser. No. 368,555 and filed Apr. 15, 1982.

2. "Coolant Flow Paths Within A Nuclear Fuel Assembly" by Pratap K. Doshi, assigned U.S. Ser. No. 602,089 and filed Apr. 19, 1984, a continuation of U.S. Ser. No. 368,552, filed Apr. 15, 1982 and now abandoned.

3. "Water Tubes Arranged In Cross-Like Pattern In A Fuel Assembly" by Carl A. Olson et al, assigned U.S. Ser. No. 642,844 and filed Aug. 20, 1984.

4. "Cross Brace For Stiffening A Water Cross In A Fuel Assembly" by C. K. Lui, assigned U.S. Ser. No. 672,042 and filed Nov. 16, 1984.

5. "Improved Boiling Water Nuclear Reactor Fuel Assembly" by Rusi Taleyarkhan, assigned U.S. Ser. No. 726,602 and filed May 2, 1985.

6. "BWR Fuel Assembly With Water Flow Mixing Chamber At Fuel Bundle/Water Cross Entrance" by Rusi Taleyarkhan, assigned U.S. Ser. No. 746,619 and filed Jun. 19, 1985.

BACKGROUND OF THE INVENTION

1. Field of the Invention

The present invention relates generally to fuel assemblies for a nuclear reactor and, more particularly, is concerned with a boiling water reactor (BWR) fuel assembly employing improvements in spacer and fuel bundle design for enhanced thermal-hydraulic performance.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In nuclear reactors generally, a plurality of the fuel rods are grouped together to form a fuel assembly. A number of such fuel assemblies are typically arranged in a matrix to form a nuclear reactor core capable of a self-sustained, nuclear fission reaction. The core is submersed in a flowing liquid, such as light water, that serves as the coolant for removing heat from the fuel rods and as a neutron moderator. Specifically, in a BWR the fuel assemblies are typically grouped in clusters of four with one control rod associated with each four assemblies. The control rod is insertable within the fuel assemblies for controlling the reactivity of the core. Each such cluster of four fuel assemblies surrounding a control rod is commonly referred to as a fuel cell of the reactor core.

A typical BWR fuel assembly in the cluster is ordinarily formed by a N by N array of the elongated fuel rods. The bundle of fuel rods are supported in laterally spaced-apart relation and encircled by an outer tubular channel having a generally rectangular cross-section. The outer flow channel extends along substantially the entire length of the fuel assembly and interconnects a top nozzle with a bottom nozzle. The bottom nozzle fits into the reactor core support plate and serves as an inlet for coolant flow into the outer channel of the fuel assembly. Coolant enters through the bottom nozzle and thereafter flows along the fuel rods removing energy from their heated surfaces.

In a fuel assembly of this type the fuel rods in the central region of the bundle thereof may be under-moderated and overenriched. In order to remedy this condition by increasing the flow of moderator water through this region of the assembly, an elongated centrally-disposed water cross is frequently used in the assembly, as disclosed in the above cross-referenced Barry et al, Doshi and Lui patent applications. The central water cross has a plurality of four radial panels which together form a cruciform water flow channel which divides the fuel assembly into four, separated elongated compartments, with the bundle of fuel rods being divided into mini-bundles disposed in the respective compartments. The water cross thus provides a centrally-disposed cross-shaped path for the flow of subcooled neutron moderator water within the channel along the lengths of, but separated from, adjacent fuel rods in the mini-bundles thereof. The fuel rods of each mini-bundle extend in laterally spaced apart relationship between an upper tie plate and a lower tie plate and connected together with the tie plates to comprise a separate fuel rod subassembly within each of the compartments of the channel. The water cross has approximately the same axial length as the fuel rod subassemblies, extending between the upper and lower tie plates thereof.

Additionally, a plurality of grids or spacers, for example six in number, are disposed at axially displaced positions along the fuel rods of each fuel rod subassembly to maintain the fuel rods in their laterally spaced relationships. The spacers are introduced to maintain the desired fuel bundle configuration and to prevent excessive fuel rod bow and flow induced vibrations. Thus, the spacers provide significant benefits from a structural standpoint.

However, the spacers are undesirable from a thermal-hydraulic performance standpoint. Specifically, they cause increased pressure drop (consequently higher coolant pumping powers are needed) and reduce the bundle critical power ratio (CPR) due to turbulence generated. The critical heat flux (CHF) deteriorates because the flow turbulence, induced by the spacers, strips away the liquid film from the heated fuel rod. This causes the bundle heat transferred to the coolant to drop significantly. Consequently heat builds up in the fuel rod causing it to overheat, and in some cases "burnout", releasing radioactivity into the coolant. This imposes a safety constraint. In order to avoid this possibility (i.e., overheating), safety analysis calculations are performed for each cycle to demonstrate that adequate margin to the CPR is always available, even under the worst postulated transient. Dedicated computer hardware performs continuous on-line surveillance of the fuel thermal margins to insure that adequate CPR margin is always maintained during reactor operations.

It is well known that different spacers exhibit variable CHF performance. Further, this performance varies radially with the fuel rod location, and in general correlates with the spacer pressure drop. The smaller the value of the pressure drop, the better is the CHF performance. However, the spacer pressure drop characteristics vary radially within the fuel rod bundle. Due to this, spacers can either be so-called "corner", "side" or "interior" limiting. If a rod peaking occurs in the limiting location, CHF occurs much earlier, and thus causes deterioration in CPR margins. It should also be noted that not all spacers for substantially identical fuel rod array configurations (having the same N×N array of fuel rods) will behave identically.

Consequently, a need exists for some design modifications to fuel assembly spacers in order to avoid or minimize the detrimental effects of CPR limiting locations within the spacers.

SUMMARY OF THE INVENTION

The present invention provides a BWR fuel assembly incorporating spacer and fuel bundle modifications which are designed to satisfy the aforementioned needs. Underlying the present invention is the recognition that it is necessary to know a spacer's basic characteristics and compensate via design modications for the detrimental effects of any CPR limiting locations. An objective analysis of the grid or spacer for its CPR characteristics has resulted in a design modification thereof which, together with a modification to the nuclear design of the fuel assembly, minimize the detrimental effect of rod peaking at CHF limited locations. The impact of these modifications on other operational and safety parameters are expected to be largely minor or beneficial in nature.

Accordingly, the present invention sets forth improved features in a BWR fuel assembly. The fuel assembly includes a bundle of elongated fuel rods disposed in side-by-side relationship so as to form an array of spaced fuel rods, an outer tubular flow channel surrounding the fuel rods so as to direct flow of coolant/moderator fluid along the fuel rods, a hollow water cross extending centrally through and interconnected with the outer flow channel so as to divide the channel into separate compartments and the bundle of fuel rods into a plurality of mini-bundles thereof being disposed in the respective compartments, and a plurality of spacers axially displaced along the fuel rods in each of the mini-bundles thereof, each spacer being composed of inner and outer means which together define spacer cells at corner, side and interior locations of the spacer and have respective protrusions (e.g. spacer dimples and springs) formed thereon which extend into the cells so as to maintain the fuel rods received through the spacer cells in laterally spaced relationships. The improved features of the present invention comprise: (a) a generally uniform poison coating within at least a majority of the fuel rods; and (b) a predetermined pattern of fuel enrichment with respect to the fuel rods of each mini-bundle thereof which together with the uniform poison coatings, such as of boron, within the fuel rods ensures that the peaking powers of fuel rods in the corner and side cells of the spacers are less than the peaking power of a leading one of the fuel rods in the interior cells of the mini-bundle.

More particularly, each of the fuel rods includes an outer tubular member having an inner clad surface and a plurality of fuel pellets contained within the tubular member. The uniform poision coating is applied to either one of the fuel pellets or the inner clad surface of the tubular member of the fuel rods in the majority thereof.

Another feature of the present invention is that each of the fuel rods received through the corner cells of each spacer has a diametric size smaller than that of the fuel rods received through the side and interior cells of each spacer. Also, each of the protrusions in the corner cells extends a greater distance into the corner cells than the distance through which the protrusions in the side and interior cells extend into the side and interior cells, whereby increased coolant flow space is provided through the corner cells as compared to the side and interior cells so as to increase heat transfer from the corner fuel rods to the coolant.

Still another feature of the present invention is that perforations are formed in the outer means (e.g. straps) at the locations of the corner and side cells of the spacer for reducing the amount of spacer area adjacent the fuel rods received in the corner and side cells and thereby increasing coolant flow to the corner and side fuel rods.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 6 is an enlarged view of the upper right hand portion of the spacer and fuel mini-bundle seen in FIG. 5, but showing the poison coating in one instance on the fuel pellets and in the other instance on the interior cladding surface of the tube.

FIG. 7 is an elevational view of the spacer as seen along line 7—7 of FIG. 5, showing another one of the improved features of the present invention in the form of perforations in the spacer for its corner and side locations for reducing the amount of wall area adjacent to the fuel rods at these locations.

FIG. 8 is a diagrammatic view of the rod locations in a fuel assembly corresponding to the U-235 enrichment pattern set forth in Table I along with the corresponding pin-wise power distribution in the bundle at various exposures.

DETAILED DESCRIPTION OF THE INVENTION

Figure 1:
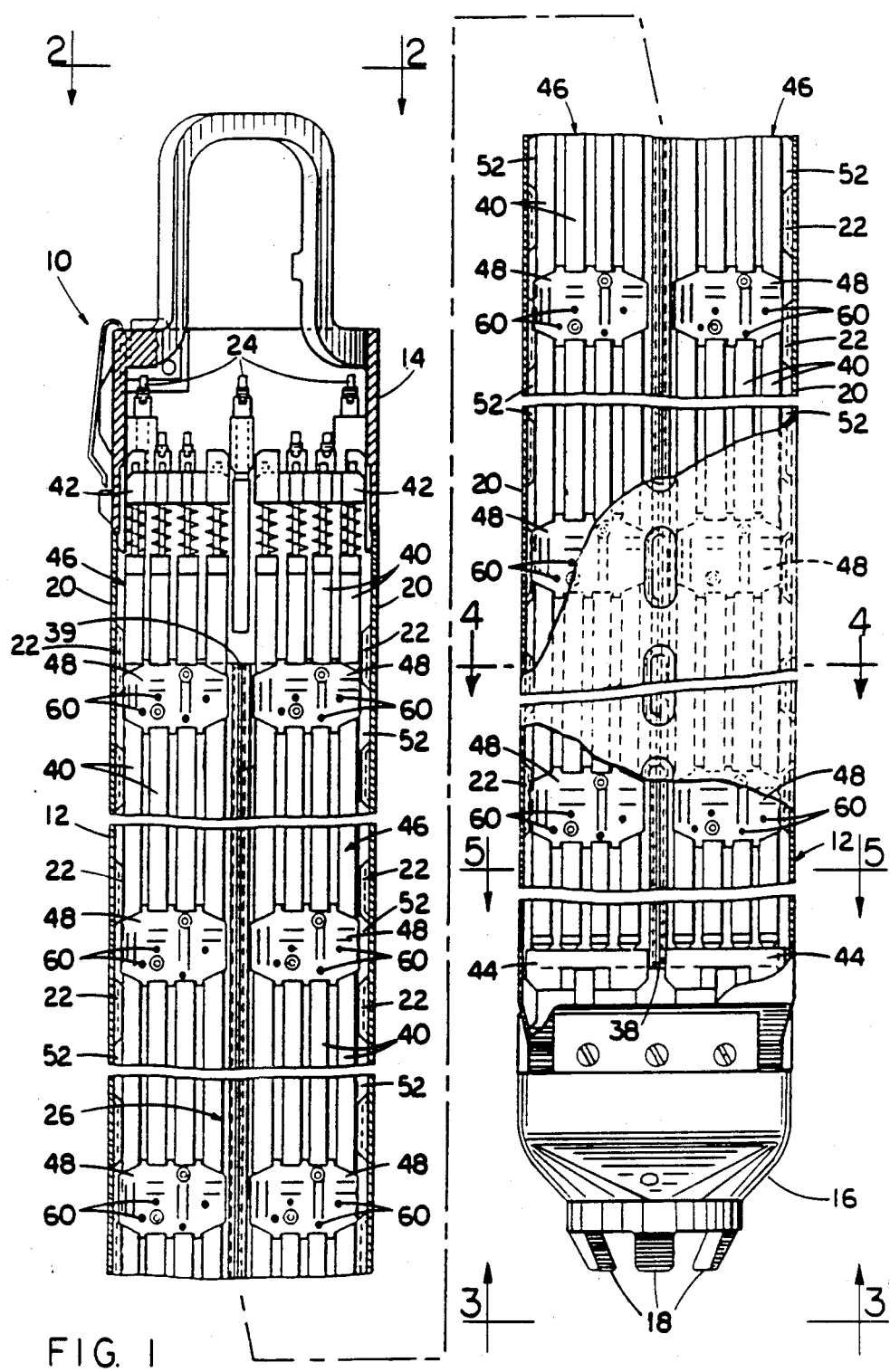
FIG. 1 is an elevational view, with parts broken away and sectioned for clarity, of a BWR nuclear fuel assembly in which the improved features of the present invention are employed.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Figure 2:
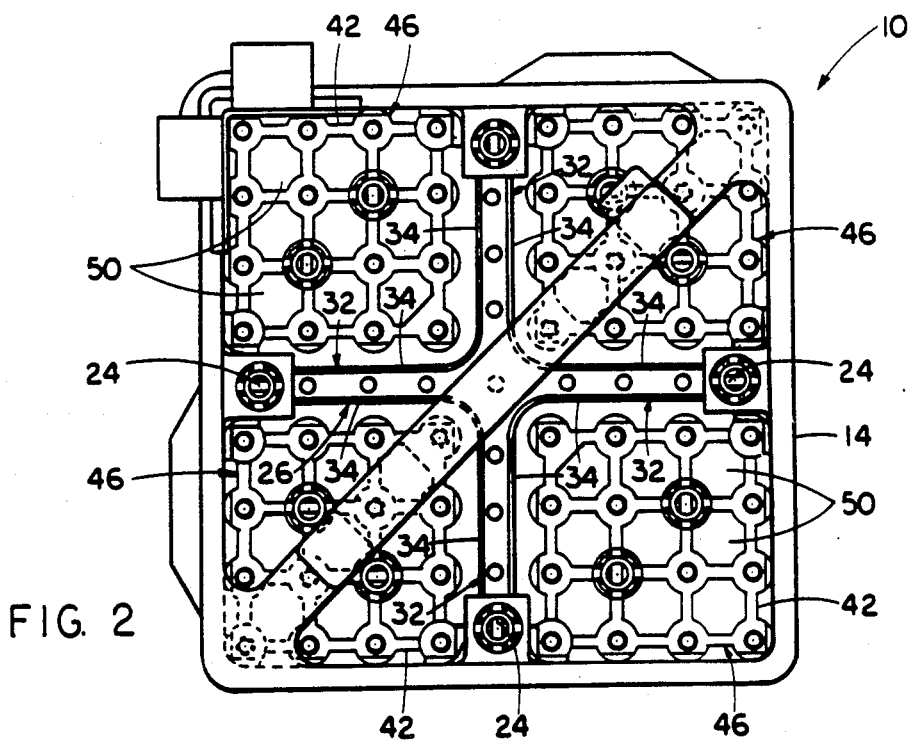
FIG. 2 is an enlarged top plan view of the fuel assembly as seen along line 2—2 of FIG. 1.
Figure 3:
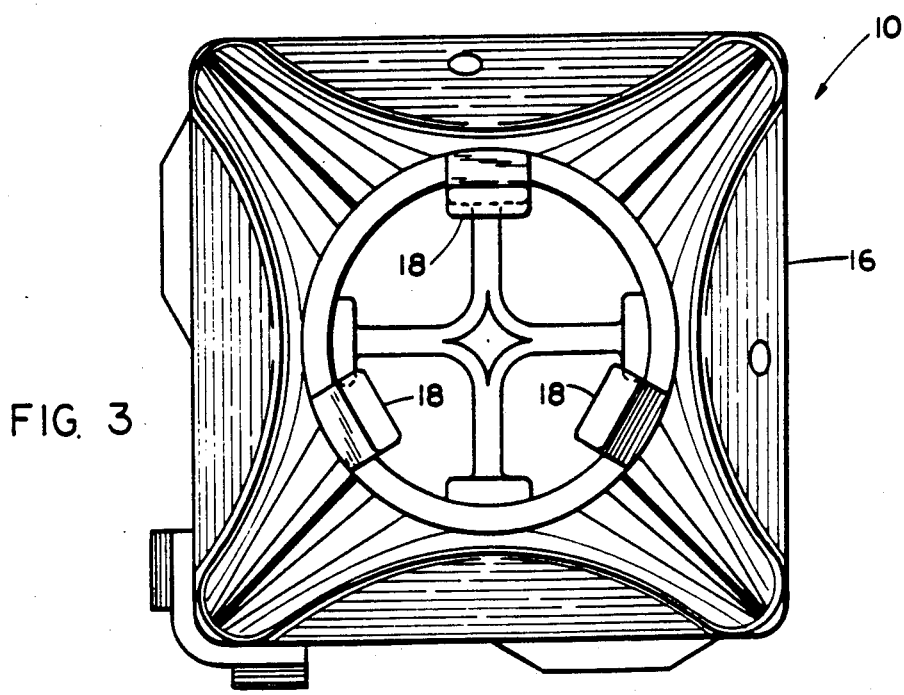
FIG. 3 is an enlarged bottom plan view of the fuel assembly as seen along line 3—3 of FIG. 1.

Referring now to the drawings, and particularly to FIGS. 1 to 3, there is shown a nuclear fuel assembly, generally designated 10 for a boiling water nuclear power reactor (BWR), in which the improvement of the present invention is incorporated. The fuel assembly 10 includes an elongated outer tubular flow channel 12 that extends along substantially the entire length of the fuel assembly 10 and interconnects an upper support fixture or top nozzle 14 with a lower base or bottom nozzle 16. The bottom nozzle 16 which serves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example in a spent fuel pool.

The outer flow channel 12 generally of rectangular cross-section is made up of four interconnected vertical walls 20 each being displaced about ninety degrees one from the next. Formed in a spaced apart relationship in, and extending in a vertical row at a central location along, the inner surface of each wall 20 of the outer flow channel 12, is a plurality of structural ribs 22. The outer flow channel 12, and thus the ribs 22 formed therein, are preferably formed from a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

Figure 4:
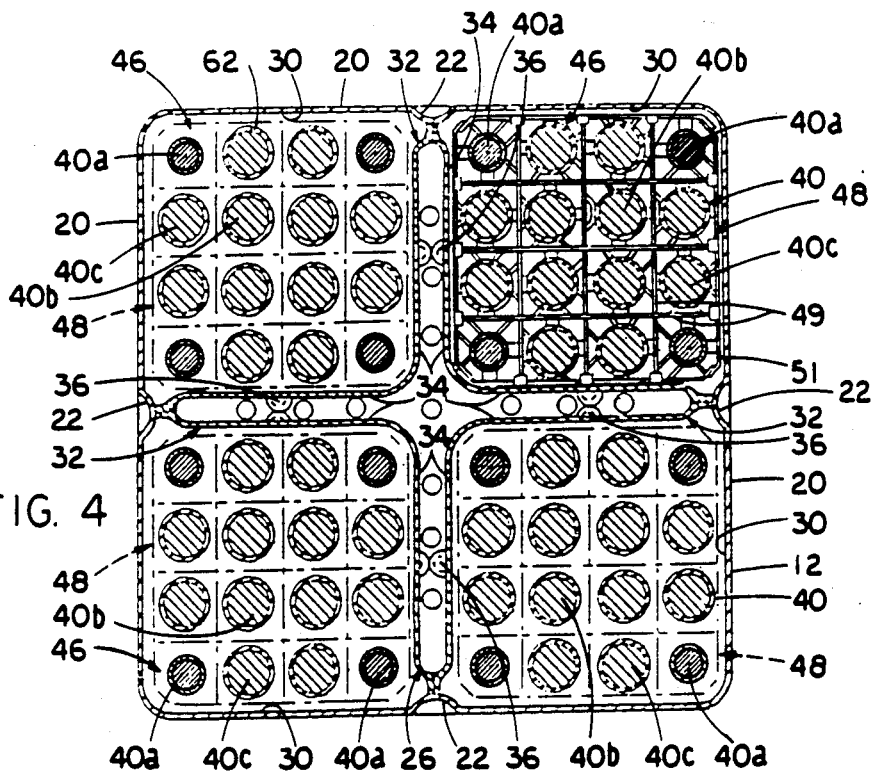
FIG. 4 is a cross-sectional view of the fuel assembly taken along line 4—4 of FIG. 1, showing the fuel rod bundle of the fuel assembly being separated into separate mini-bundles by the water cross with a grid or spacer surrounding one of the mini-bundles being shown in full, while the spacers surrounding the other three mini-bundles are shown in outline form, and also showing one of the improved features of the present invention in the form of those fuel rods of each mini-bundle thereof being located at the corners of the spacers having reduced diameters compared with the remaining fuel rods which provides the spacer with increased coolant flow area at each corner location.
Figure 5:
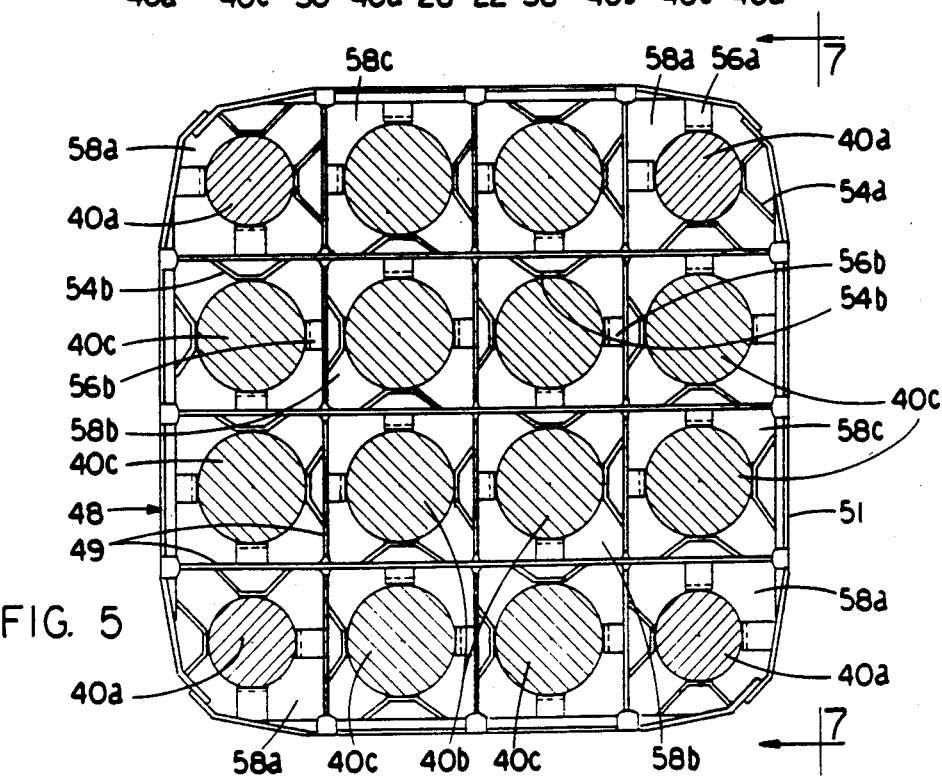
FIG. 5 is an enlarged view of the spacer and fuel mini-bundle in the upper right hand quadrant of the fuel assembly seen in FIG. 4, with the fuel rods being depicted as solid circles and without their cladding tubes being shown for purposes of clarity.

For improving neutron moderation and economy, a hollow water cross, as seen in FIGS. 1, 2 and 4 and generally designated 26, extends axially through the outer channel 12 so as to provide an open inner channel 28 for subcooled moderator flow through the fuel assembly 10 and to divide the fuel assembly into four, separate, elongated compartments 30. The water cross 26 has a plurality of four radial panels 32 composed by a plurality of four, elongated, generally L-shaped, metal angles or sheet members 34 that extend generally along the entire length of the channel 12. The sheet members 34 of each panel 32 are interconnected and spaced apart by a series of elements in the form of dimples 36 formed therein and extending therebetween. The dimples 36 are provided in opposing pairs that contact each other along the lengths of the sheet members 34 to maintain the facing portions of the members in a proper spaced-apart relationship. The pairs of contacting dimples 36 are connected together such as by welding to ensure that the spacing between the sheet members 34 forming the panels 32 of the central water cross 26 is accurately maintained.

The hollow water cross 26 is mounted to the angularly-displaced walls 20 of the outer channel 12. Preferably, the outer, elongated lateral ends of the panels 32 of the water cross 26 are connected such as by welding to the structural ribs 22 along the lengths thereof in order to securely retain the water cross 26 in its desired central position within the fuel assembly 10. Further, the inner ends of the panels together with the outer ends thereof define the inner central cruciform channel 28 which extends the axial length of the hollow water cross 26. Also, the water cross 26 has a lower flow inlet end 38 and an opposite upper flow outlet end 39 which each communicate with the inner channel 28 for providing subcoolant flow therethrough.

Disposed within the channel 12 is a bundle of fuel rods 40 which, in the illustrated embodiment, number sixty-four and form an $8 \times 8$ array. The fuel rod bundle is, in turn, separated into four mini-bundles thereof by the water cross 26. The fuel rods 40 of each mini-bundle, such being sixteen in number in a $4 \times 4$ array, extend in laterally spaced apart relationship between an upper tie plate 42 and a lower tie plate 44. The fuel rods in each mini-bundle are connected to the upper and lower tie plates 42,44 and together therewith comprise a separate fuel rod subassembly 46 within each of the compartments 30 of the channel 12. A plurality of grids or spacers 48 axially spaced along the fuel rods 40 of each fuel rod subassembly 46 are composed of interleaved inner straps 49 and an outer strap 51 which maintain the fuel rods in their laterally spaced relationships. The lower and upper tie plates 42,44 of the respective fuel rod subasselmblies 46 have flow openings 50 defined therethrough for allowing the flow of the coolant fluid into and from the separate fuel rod subassemblies. Also, coolant flow paths provide flow communication between the fuel rod subassemblies 46 in the respective separate compartments 30 of the fuel assembly 10 through a plurality of openings 52 formed between each of the structural ribs 22 along the lengths thereof. Coolant flow through the openings 52 serves to equalize the hydraulic pressure between the four separate compartments 30, thereby minimizing the possibility of thermal hydrodynamic instability between the separate fuel rod subassemblies 46.

The above-described basic components of the BWR fuel assembly 10 are known in the prior art, being disclosed particularly in the Doshi application cross-referenced above, and have been discussed in sufficient detail herein to enable one skilled in the art to understand the improved feature of the present invention presented hereinafter. For a more detailed description of the construction of the BWR fuel assembly, attention is directed to both of the above cross-referenced Barry et al and Doshi patent applications.

Spacer and Fuel Bundle Modifications of Present Invention

The improvements of the present invention relate to modifications made in the spacer and fuel bundle design described above which significantly improve the CHF characteristics of the BWR fuel assembly 10. The mechanical design modifications provided by the present invention for improved cooling performance are the following two.

First, fuel rods 40a are provided at the corners of the spacers 48, as seen in FIGS. 4 to 7, which have a diameter less than that of the remaining interior and side fuel rods 40b,40c. The reduction in the diametric size of the corner fuel rods 40a requires an increase in the distance through which the protrusions formed on the inner and outer straps 49,51 of the spacer, e.g. the spacer dimples 54a and springs 56a, extend into the corner spacer cells 58a as compared to the extension of the remaining dimples 54b and springs 56b into the interior and side spacer cells 58b,58c. Such reduction in the diametric size of the corner fuel rods 40a results in an increase in the flow area per rod (i.e., equal to that for side and interior locations) for the four corner locations.

An optimized diameter for the corner rod fuel rods 40a would result in providing a flow area per rod equal to the interior spacer cells 58b. In general, this is obtained from the following formula:

$$A_I = A_{c1} + \pi/4(d_{c1}^2 - d_{c2}^2)$$

or $$d_{c2} = 4/\pi(A_{c1} - A_I + \pi/4(d_{c1}^2))]^{\frac{1}{2}}$$

where,
$d_{c1}$ = corner rod diameter in present design
$d_{c2}$ = reduced corner diameter in proposed design
$A_I$ = Flow Area per rod in interior spacer locations
$A_{c1}$ = Flow Area per rod for corner rod in present design Substituting the dimension values of a given spacer and rod design into the above formula, a reduced rod diameter of 0.431 inch for the corner rods were obtained, which is smaller than the diameter of 0.458 inch for the other non-corner rods.

Second, openings or perforations 60 are made in the outer strap 51 of each spacer 48 at the corner and side spacer cells 58a,58c, as seen in FIG. 7. These perforations 60 reduce the amount of wall area of the spacer sides 62 adjacent to the corner and side fuel rods 40a,40c and increases access of coolant to these spacer locations.

To summarize, the above-described first and second modifications respectively increase the flow area around the heated fuel rod and decrease the amount of unheated wall surface area adjacent to the heated fuel rod. Thus, correspondingly, coolant flow is increased in the areas of the spacer, the corners thereof, at which coolant normally encounters the highest resistance and pressure drop, and the clinging of coolant onto the spacer wall which lessens the amount of coolant provided to the heated fuel rod surface is reduced.

While the first and second modifications ordinarily improve the CHF characteristics of the fuel assembly 10, a third modification of the present invention is desirable from a strategic standpoint. This is due to the fact that the mechanical design modifications outlined above can only reduce the detrimental impact of limiting spacer locations, but not eliminate them. Thus, a good nuclear design for the fuel bundle to avoid excessive rod peaking in the limiting locations becomes essential.

In the third modification, the nuclear design of the fuel bundle (i.e., enrichment, burnable poison distribution, etc.) is changed in a manner which assures that rod peaking does not occur in the corner/limiting locations. The third modification is directed to the use of a uniform poison, such as boron, in the form of coatings on the inside of the majority of the fuel rods 40. More particularly, each of the fuel rods 40 includes an outer cladding tube 62 having an inner clad surface 64 and a plurality of fuel pellets 66 contained within the tube. As seen in FIG. 6, the uniform poison coating 68 is applied to either the outer surface of the fuel pellets 66 or to the inner clad surface 64 of each of the tubes 62 of the fuel rods 40 in the majority thereof.

Typically, the cladding tube 62 in a BWR fuel assembly is composed of Zircaloy-2, whereas, in a PWR fuel assembly, the cladding tube 62 is composed of Zircaloy-4. It is anticipated that the technique for applying the boron coating on the inside of clad tube 62, or clad surface 64, would be accomplished in the same manner as applying the coating to the outside surface of the pellets. Basically, zirc di-boride is sputtered onto the pellets by hitting a zirc di-boride target in a vacuum chamber wherein the boron is sputtered onto the surface of the pellet. It should suffice to say that the boron coating technology is known by those skilled in the art and is not a part of this invention. A practical boron coating thickness would range from 0.0005 inch to 0.0015 inch, even 0.002 inch may be practical. A 0.0005 inch thick boron coating represents a 1.9 mg/inch of rod length B-10 poison loading on the pellet.

Example

Preliminary lattice transport theory calculations, using the PHOENIX code, were carried out to determine whether a fuel assembly can be neutronically designed in such a manner as to always assure that both the corner and side rods 40a,40c have pin powers below the lead rod in the bundle. The PHOENIX code is a two-dimensional X-4 transport theory code developed by ASEA-ATOM and licensed in the United States by the NRC to perform single or four-bundle physics calculations. These calculations include the calculation of the pin-wise power distribution, depletion of the fuel pins and burnable absorber pins and the generation of cross-sections homogenized over the assembly.

The reference bundle design chosen as the starting point was a QUAD+ BWR bundle design for a C lattice (equal outer water gaps) plant with 2.912 w/o U-235 bundle-average enrichment and eight gadolinia rods of 3.2 w/o Gd2O3. The enrichment pattern and the pin-wise power distribution verses exposure are shown in Table IV. The bundle reactivity (k-inf) is tabulated verses exposure in Table I. The bundle reactivities and pin power distribution correspond to a 50% void depletion.

A change to the U-235 enrichment pattern was made to assure that the four corner rods in each of the four QUAD+ mini-bundles comprising the assembly would never lead the bundle in pin power. The bundle average enrichment of 2.912 w/o U-235 was maintained. The gadolinium pattern and loading remained unchanged. The revised U-235 enrichment pattern is shown in Table V along with the pin-wise power distribution at various exposures. Table II compares the maximum pin powers for the lead pin in the bundle verses the highest-powered corner pin. The corner pins stay substantially below the lead pin in the bundle. In the 7 22 GWD/MTU burnup range where the bundle will be critical power ratio limited, the maximum corner pin power is 12-14% below the lead pin in the bundle. The corner pins never lead the bundle in pin power at any burnup as demonstrated in Table II. Thus, it is clearly demonstrated that if a fairly homogeneous bundle absorber is used and applied to the majority of the fuel rods, then it is possible to develop a U-235 enrichment pattern that always assures that neither side nor corner pins lead the bundle in pin power. Such a U-235 enrichment pattern corresponding to rod locations shown in FIG. 8, along with pin-wise power distribution in the bundle at various exposures, is given in Table II.

Should the corner rods be found limiting from a critical power ratio viewpoint as a result of the spacer design, a bundle enrichment design can be developed that decreases the corner rod powers and correspondingly increases the pin powers of the remaining rods so as to balance out the critical power ratio performance of all the rods. Table I compares the bundle reactivity of this reduced corner rod power case against the reference case. In the 22–26 GWD/MTU exposure range, typical of the end-of-cycle core average exposure for reload cycles, Table I shows that there is only a 30–60 pcm difference in reactivity which is a trivial difference.

Table III compares the maximum pin power of any side or corner rod verses the lead pin and confirms that neither the corner nor side fuel rods are ever the peak rod in the bundle until 38–42 GWD/MTU. Typically, the maximum corner/side rod is three to four percent lower in pin-power than the lead rod. This is estimated to be possible only with a uniform poison design, such as mentioned above. The design shown in FIG. 8 and Table VI maintains the corner/side rods at least three to four percent in rod power below the lead (interior) rod in the bundle. This difference in side/corner verses interior rod power can be adjusted through proper selection of the U-235 enrichment pattern to balance out the critical power performance of all the fuel rods.

TABLE I

| COMPARISON OF BUNDLE K-inf | |
|---|---|
| Burnup (MWD/MTU) | Difference (Reference-Corner Rod) Case |
| 0 | +622 pcm |
| 2000 | +255 |
| 4000 | +61 |
| 6000 | +134 |
| 8000 | +176 |
| 10000 | +146 |
| 14000 | +118 |
| 18000 | +90 |
| 22000 | +62 |
| 26000 | +34 |
| 30000 | +6 |
| 34000 | −25 |
| 38000 | −43 |
| 42000 | −58 |

TABLE II

COMPARISON OF ROD-WISE LOCAL PEAKING FACTORS-CASE WITH CORNER RODS NEVER LIMITING FOR PIN POWER

| Burnup (MWD/MIU) | Relative Power For Peak Rod In Bundle | Peak Corner Rod Power | Difference (Peak-Corner)/Peak × 100% |
|---|---|---|---|
| 0 (no Xenon) | 1.135 | 1.032 | 9.1% |
| 0 (Equil. Xenon) | 1.133 | 1.034 | 8.7% |
| 500 | 1.126 | 1.032 | 8.3% |
| 1000 | 1.116 | 1.028 | 7.9% |
| 2000 | 1.097 | 1.014 | 7.6% |
| 3000 | 1.081 | 0.996 | 7.9% |
| 4000 | 1.067 | 0.979 | 8.2% |
| 5000 | 1.056 | 0.962 | 8.9% |
| 6000 | 1.047 | 0.949 | 9.4% |
| 7000 | 1.068 | 0.941 | 11.9% |
| 8000 | 1.087 | 0.938 | 13.7% |
| 9000 | 1.093 | 0.938 | 14.2% |
| 10000 | 1.094 | 0.939 | 14.2% |
| 14000 | 1.089 | 0.943 | 13.4% |
| 18000 | 1.083 | 0.946 | 12.7% |
| 22000 | 1.076 | 0.950 | 11.7% |
| 26000 | 1.067 | 0.955 | 10.5% |
| 30000 | 1.056 | 0.963 | 8.8% |
| 34000 | 1.050 | 0.974 | 7.2% |
| 38000 | 1.041 | 0.984 | 5.5% |
| 42000 | 1.028 | 1.000 | 2.7% |

TABLE III

COMPARISON OF ROD-WISE LOCAL PEAKING FACTORS BOTH CORNER AND SIDE RODS NEVER LIMITING FOR PIN POWER

| Burnup (MWD/MIU) | Relative Power For Peak Rod In Bundle | Max. Pin Power For Corner or Side Rods | Difference (Peak-Corner/Side)/Peak × 100% |
|---|---|---|---|
| 0 (No Xenon) | 1.106 | 1.026 | 7.2% |
| 0 (Equil. Xenon) | 1.103 | 1.029 | 6.7% |
| 500 | 1.099 | 1.031 | 6.2% |
| 1000 | 1.095 | 1.032 | 5.8% |
| 2000 | 1.090 | 1.034 | 5.1% |
| 3000 | 1.086 | 1.034 | 4.8% |
| 4000 | 1.082 | 1.035 | 4.3% |
| 5000 | 1.080 | 1.034 | 4.3% |
| 6000 | 1.077 | 1.034 | 4.0% |
| 7000 | 1.075 | 1.033 | 3.9% |
| 8000 | 1.073 | 1.032 | 3.8% |
| 9000 | 1.072 | 1.031 | 3.8% |
| 10000 | 1.070 | 1.030 | 3.7% |
| 14000 | 1.065 | 1.025 | 3.8% |
| 18000 | 1.060 | 1.019 | 3.9% |
| 22000 | 1.053 | 1.014 | 3.7% |
| 26000 | 1.045 | 1.013 | 3.1% |
| 30000 | 1.036 | 1.016 | 1.9% |
| 34000 | 1.024 | 1.018 | 0.6% |
| 38000 | 1.021 | 1.021 | 0.0% |
| 42000 | 1.022 | 1.022 | 0.0% |

TABLE IV

REFERENCE CASE
(*IDENTIFIES LEAD INTERIOR PIN)

0 MWD/MTU (NO XENON)

TABLE IV-continued
REFERENCE CASE
(*IDENTIFIES LEAD INTERIOR PIN)

| RELATIVE POWER (W/CM$^2$) | WT % U-235 PER PIN |
|---|---|
| 1.052 | 1.898 AVE: 2.9120 |
| 1.107 1.092 | 2.474 3.378 |
| 1.123 0.368 0.938 | 2.774 3.378 3.378 |
| 1.108 1.124* 1.095 1.066 | 2.474 3.253 3.253 2.774 |

| 0 MWD/MTU (EQUIL. XENON) RELATIVE POWER (W/CM$^2$) | 8000 MWD/MTU RELATIVE POWER (W/CM$^2$) |
|---|---|
| 1.054 | 0.938 |
| 1.107 1.089 | 0.982 1.052* |
| 1.123* 0.374 0.936 | 1.020 1.003 0.967 |
| 1.109 1.122 1.093 1.065 | 0.994 1.042 1.002 0.959 |

| 1000 MWD/MTU RELATIVE POWER (W/CM$^2$) | 14000 MWD/MTU RELATIVE POWER (W/CM$^2$) |
|---|---|
| 1.054 | 0.935 |
| 1.095 1.076 | 0.975 1.045* |
| 1.109* 0.455 0.932 | 1.012 1.012 0.978 |
| 1.099 1.107 1.077 1.053 | 0.991 1.040 1.007 0.968 |

| 4000 MWD/MTU RELATIVE POWER (W/CM$^2$) | 22000 MWD/MTU RELATIVE POWER (W/CM$^2$) |
|---|---|
| 0.996 | 0.938 |
| 1.033 1.056 | 0.968 1.036 |
| 1.059 0.768 0.943 | 1.003 1.010 0.994 |
| 1.043 1.067* 1.032 1.000 | 0.988 1.039* 1.017 0.982 |

TABLE V
CORNER RODS NEVER LIMITING LOCATIONS
(*IDENTIFIES LEAD INTERIOR PIN)

| 0 MWD/MTU (NO XENON) RELATIVE POWER (W/CM$^2$) | WT % U-235 PER PIN |
|---|---|
| 1.007 | 1.769 AVE: 2.9120 |
| 1.133 1.067 | 2.493 3.219 |
| 1.125 0.410 1.049 | 2.719 3.819 3.819 |
| 1.032 1.135* 1.105 0.995 | 2.219 3.219 3.219 2.493 |

| MWD/MTU (EQUIL. XENON) RELATIVE POWER (W/CM$^2$) | 8000 MWD/MTU RELATIVE POWER (W/CM$^2$) |
|---|---|
| 1.009 | 0.907 |
| 1.133* 1.065 | 0.990 1.020 |
| 1.125 0.416 1.045 | 1.011 1.087* 1.046 |
| 1.034 1.133 1.102 0.995 | 0.938 1.038 0.998 0.904 |

| 1000 MWD/MTU RELATIVE POWER (W/CM$^2$) | 14000 MWD/MTU RELATIVE POWER (W/CM$^2$) |
|---|---|
| 1.011 | 0.911 |
| 1.116* 1.051 | 0.980 1.016 |
| 1.109 0.507 1.034 | 1.003 1.089* 1.050 |
| 1.028 1.115 1.084 0.986 | 0.943 1.035 1.002 0.920 |

| 4000 MWD/MTU RELATIVE POWER (W/CM$^2$) | 22000 MWD/MTU RELATIVE POWER (W/CM$^2$) |
|---|---|
| 0.959 | 0.920 |
| 1.046 1.027 | 0.971 1.010 |
| 1.052 0.845 1.032 | 0.994 1.076* 1.057 |
| 0.979 1.067* 1.032 0.939 | 0.950 1.033 1.012 0.941 |

TABLE VI
BOTH CORNER AND SIDE RODS NEVER LIMITING FOR PIN POWER (*IDENTIFIES LEAD INTERIOR PIN)

| 0 MWD/MTU (NO XENON) RELATIVE POWER (W/CM$^2$) | WT % U-235 PER PIN |
|---|---|
| 0.940 | 2.052 AVE: 2.9120 |
| 1.015 1.106* | 2.628 3.532 |
| 0.974 1.057 1.010 | 2.628 3.532 3.532 |
| 1.026 0.972 0.932 0.991 | 2.628 2.928 2.928 2.928 |

| 0 MWD/MTU (EQUIL. XENON) RELATIVE POWER (W/CM$^2$) | 8000 MWD/MTU RELATIVE POWER (W/CM$^2$) |
|---|---|
| 0.946 | 0.976 |
| 1.017 1.103* | 1.015 1.073* |
| 0.975 1.053 1.005 | 0.983 1.033 0.993 |
| 1.029 0.971 0.931 0.991 | 1.032 0.976 0.942 0.997 |

| 1000 MWD/MTU RELATIVE POWER (W/CM$^2$) | 14000 MWD/MTU RELATIVE POWER (W/CM$^2$) |
|---|---|
| 0.957 | 0.971 |
| 1.019 1.095* | 1.006 1.065* |
| 0.978 1.047 1.000 | 0.983 1.032 0.999 |
| 1.032 0.971 0.931 0.992 | 1.025 0.981 0.954 1.002 |

| 4000 MWD/MTU RELATIVE POWER (W/CM$^2$) | 22000 MWD/MTU RELATIVE POWER (W/CM$^2$) |
|---|---|
| 0.972 | 0.965 |
| 1.019 1.082* | 0.994 1.053* |
| 0.981 1.037 0.993 | 0.981 1.033 1.010 |
| 1.035 0.972 0.935 0.994 | 1.014 0.989 0.971 1.009 |

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a fuel assembly having a bundle of elongated fuel rods disposed in side-by-side relationship so as to form an array of spaced fuel rods, an outer tubular flow channel surrounding said fuel rods so as to direct flow of coolant/moderator fluid along said fuel rods, a hollow water cross extending centrally through and interconnected with said outer flow channel so as to divide said channel into separate compartments and said bundle of fuel rods into a plurality of mini-bundles thereof being disposed in said compartments, and a plurality of spacers axially displaced along said fuel rods in each of said mini-bundles thereof, each spacer being composed of inner and outer means which together define spacer cells at corner, side and interior locations of said spacer and have respective protrusions formed thereon which extend into cells so as to maintain said fuel rods received through said spacer cells in laterally spaced relationships, the improvement which comprises:

(a) a generally uniform poison coating within at least a majority of said fuel rods;

(b) a predetermined pattern of fuel enrichment with respect to said fuel rods of each mini-bundle thereof which together with said uniform poison coating within said fuel rods ensures that the packing powers of the fuel rods in said corner and side cells of said spacers are less than the peaking power of a leading one of said fuel rods in said interior cells of said spacers; and (c) each of said fuel rods being received through said cells of said each spacer having a diametric size smaller than that of each of said fuel rods received through said side and interior cells of said each spacer, said diametric sizes of each of said fuel rods received through said side and interior cells of each spacer being generally equal.

2. The fuel assembly as recited in claim 1, wherein said uniform poison is boron.

3. The fuel assembly as recited in claim 1, wherein: each of said fuel rods includes an outer tubular member having an inner clad surface and a plurality of fuel pellets contained within said tubular member; and said uniform poison coating is applied to one of said fuel pellets and said inner clad surface of said tubular member.

4. The fuel assembly as recited in claim 1, further comprising:

each of said protrusions in said corner cells extending a greater distance into said corner cells than the distance through which said protrusions in said side and interior cells extend into said side and interior cells, whereby increased coolant flow space is provided through said corner cells as compared to said side and interior cells so as to increase heat transfer from said corner fuel rods to the coolant.

5. The fuel assembly as recited in claim 1, further comprising:

perforations formed in said outer spacer means at the locations of said corner and side cells of said spacer for reducing the amount of area of spacer material adjacent said fuel rods received in said corner and side cells and thereby increasing coolant flow to said corner and side fuel rods.

6. In a fuel assembly having a bundle of elongated fuel rods disposed in side-by-side relationship so as to form an array of spaced fuel rods, an outer tubular flow channel surrounding said fuel rods so as to direct flow of coolant/moderator fluid along said fuel rods, a hollow water cross extending centrally through and interconnected with said outer flow channel so as to divide said channel into separate compartments and said bundle of fuel rods into a plurality of mini-bundles thereof being disposed in said respective compartments, and a plurality of spacers axially displaced along said fuel rods in each of said mini-bundles thereof, each of said fuel rods including an outer tubular member having an inner clad surface and a plurality of fuel pellets contained within said tubular member, each spacer being composed of a plurality of interleaved inner straps and an outer strap encompassing said inner straps, said interleaved inner straps and said outer strap having respective protrusions formed thereon and together defining spacer cells into which said respective protrusions extend to maintain said fuel rods received through said spacer cells in laterally spaced relationships in respective corner and side cells defined by said interleaved inner straps together with said outer straps and in respective interior cells defined by said interleaved inner straps along, the improvement which comprises:

(a) each of said fuel rods received through said corner cells of said each spacer having a diametric size smaller than that of each of said fuel rods received through said side and interior cells of said each spacer, said diametric sizes of each of said fuel rods received through said side and interior cells of each spacer being generally equal;

(b) each of said protrusions in said corner cells extending a greater distance into said corner cells than the distance through which said protrusions in said side and interior cells extend into said side and interior cells, whereby increased coolant flow space is provided through said corner cells as compared to said side and interior cells so as to increase heat transfer from said corner fuel rods to the coolant;

(c) perforations formed in said outer strap at the locations of said corner and side cells of said each spacer for reducing the amount of strap area adjacent said fuel rods received in said corner and side cells and thereby increasing coolant flow to said corner and side fuel rods;

(d) a generally uniform poison coating within at least a majority of said fuel rods, said uniform poison coating being applied to one of said fuel pellets and said inner clad surface of said tubular member of said each fuel rod in said majority thereof; and (e) a predetermined pattern of fuel enrichment with respect to said fuel rods of each mini-bundle thereof which together with said uniform poison coatings within said fuel rods ensures that the peaking powers of fuel rods in said corner and side cells of said spacers are less than the peaking power of a leading one of said fuel rods in said interior cells of said spacers.

7. The fuel assembly as recited in claim 6, wherein said uniform poison is boron.

* * * * *